United States Patent
Cowley et al.

(10) Patent No.: US 12,539,134 B2
(45) Date of Patent: Feb. 3, 2026

(54) SURGICAL INSTRUMENTS, SYSTEMS, AND METHODS INCORPORATING ULTRASONIC AND THREE-PHASE ELECTROSURGICAL FUNCTIONALITY

(71) Applicant: Covidien LP, Mansfield, MA (US)

(72) Inventors: Matthew S. Cowley, Frederick, CO (US); Michael B. Lyons, Boulder, CO (US); David J. Van Tol, Boulder, CO (US); Keith W. Malang, Longmont, CO (US)

(73) Assignee: Covidien LP, Mansfield, MA (US)

( * ) Notice: Subject to any disclaimer, the term of this patent is extended or adjusted under 35 U.S.C. 154(b) by 174 days.

(21) Appl. No.: 18/560,655

(22) PCT Filed: May 2, 2022

(86) PCT No.: PCT/IB2022/054050
§ 371 (c)(1),
(2) Date: Nov. 13, 2023

(87) PCT Pub. No.: WO2022/243773
PCT Pub. Date: Nov. 24, 2022

(65) Prior Publication Data
US 2024/0245420 A1 Jul. 25, 2024

Related U.S. Application Data

(60) Provisional application No. 63/189,531, filed on May 17, 2021.

(51) Int. Cl.
*A61B 17/32* (2006.01)
*A61B 17/00* (2006.01)
(Continued)

(52) U.S. Cl.
CPC .... *A61B 17/320068* (2013.01); *A61B 17/285* (2013.01); *A61B 34/35* (2016.02);
(Continued)

(58) Field of Classification Search
CPC ............ A61B 17/320068; A61B 34/35; A61B 17/285; A61B 2017/320075;
(Continued)

(56) References Cited

U.S. PATENT DOCUMENTS

| | | | |
|---|---|---|---|
| 5,190,517 A | 3/1993 | Zieve et al. | |
| 5,312,329 A | 5/1994 | Beaty et al. | |

(Continued)

FOREIGN PATENT DOCUMENTS

| | | | |
|---|---|---|---|
| EP | 3 505 103 A1 | 7/2019 | |
| WO | 2020198372 A1 | 10/2020 | |
| WO | 2021206852 A1 | 10/2021 | |

OTHER PUBLICATIONS

European Search Report for EP Application No. 22 723 782.3 mailed May 13, 2025 (4 pages).
(Continued)

*Primary Examiner* — Ashley L Fishback

(57) ABSTRACT

A surgical system includes an ultrasonic generator configured to provide an ultrasonic drive signal, an ultrasonic transducer coupled to the ultrasonic generator to receive the drive signal and produce mechanical ultrasonic energy, an electrosurgical generator configured to output three-phase RF energy, and an end effector assembly. The end effector assembly includes an ultrasonic blade coupled to the transducer to supply the mechanical ultrasonic energy to tissue to treat tissue. At least a portion of the ultrasonic blade defines a first electrode; second and third electrodes are also provided. The first and second electrodes, the first and third electrodes, and the second and third electrodes are electri-
(Continued)

cally coupled to the electrosurgical generator and configured to conduct the first, second, and third phases, respectively, of the three-phase RF energy therebetween and through tissue to at least one of treat or interrogate tissue.

20 Claims, 10 Drawing Sheets

(51) Int. Cl.
 *A61B 17/285* (2006.01)
 *A61B 34/35* (2016.01)
(52) U.S. Cl.
 CPC ........... *A61B 2017/00026* (2013.01); *A61B 2017/00075* (2013.01); *A61B 2017/00172* (2013.01); *A61B 2017/00199* (2013.01); *A61B 2017/00398* (2013.01); *A61B 2017/00464* (2013.01); *A61B 2017/00734* (2013.01); *A61B 2017/320075* (2017.08); *A61B 2217/005* (2013.01); *A61B 2217/007* (2013.01)
(58) Field of Classification Search
 CPC ........ A61B 2017/00026; A61B 2017/00075; A61B 2017/00172; A61B 2017/00199; A61B 2017/00398; A61B 2017/00464; A61B 2017/00734; A61B 2217/005; A61B 2217/007
 See application file for complete search history.

(56) References Cited

U.S. PATENT DOCUMENTS

| | | | |
|---|---|---|---|
| 5,443,463 A | 8/1995 | Stern et al. | |
| 6,152,923 A | 11/2000 | Ryan | |
| 6,251,110 B1 | 6/2001 | Wampler | |
| 6,257,241 B1 | 7/2001 | Wampler | |
| 6,416,486 B1 | 7/2002 | Wampler | |
| 6,562,032 B1 | 5/2003 | Ellman et al. | |
| 6,736,814 B2 | 5/2004 | Manna et al. | |
| 7,717,913 B2 | 5/2010 | Novak et al. | |
| 8,192,433 B2 | 6/2012 | Johnson et al. | |
| 8,568,411 B2 | 10/2013 | Falkenstein et al. | |
| 8,773,001 B2 | 7/2014 | Wiener et al. | |
| 9,700,366 B2 | 7/2017 | Paulus | |
| 2001/0051803 A1 | 12/2001 | Desai et al. | |
| 2006/0015095 A1 | 1/2006 | Desinger et al. | |
| 2006/0178667 A1 | 8/2006 | Sartor et al. | |
| 2007/0173872 A1 | 7/2007 | Neuenfeldt | |
| 2008/0132887 A1 | 6/2008 | Masuda et al. | |
| 2008/0172048 A1 | 7/2008 | Martin et al. | |
| 2009/0248021 A1 | 10/2009 | McKenna | |
| 2010/0030210 A1 | 2/2010 | Paulus | |
| 2010/0137854 A1 | 6/2010 | Hosier | |
| 2010/0145329 A1 | 6/2010 | Bystryak et al. | |
| 2010/0145335 A1 | 6/2010 | Johnson et al. | |
| 2011/0015627 A1 | 1/2011 | DiNardo et al. | |
| 2012/0150176 A1 | 6/2012 | Weizman | |
| 2013/0066311 A1 | 3/2013 | Smith et al. | |
| 2014/0067015 A1 | 3/2014 | Kothandaraman et al. | |
| 2014/0114327 A1 | 4/2014 | Boudreaux et al. | |
| 2014/0135804 A1 | 5/2014 | Weisenburgh, II et al. | |
| 2014/0330271 A1 | 11/2014 | Dietz et al. | |
| 2015/0164533 A1 | 6/2015 | Felder et al. | |
| 2015/0182251 A1 | 7/2015 | Messerly et al. | |
| 2016/0038220 A1 | 2/2016 | Twomey | |
| 2016/0317216 A1 | 11/2016 | Hermes et al. | |
| 2017/0007317 A1 | 1/2017 | Allen, IV et al. | |
| 2017/0105754 A1 | 4/2017 | Boudreaux et al. | |
| 2017/0164973 A1 | 6/2017 | Lesko et al. | |
| 2017/0202609 A1 | 7/2017 | Shelton, IV et al. | |
| 2021/0038292 A1* | 2/2021 | Kabala | A61B 18/1445 |

OTHER PUBLICATIONS

International Search Report for PCT/IB2022/054050 mailed Jun. 29, 2022 (5 pages).

\* cited by examiner

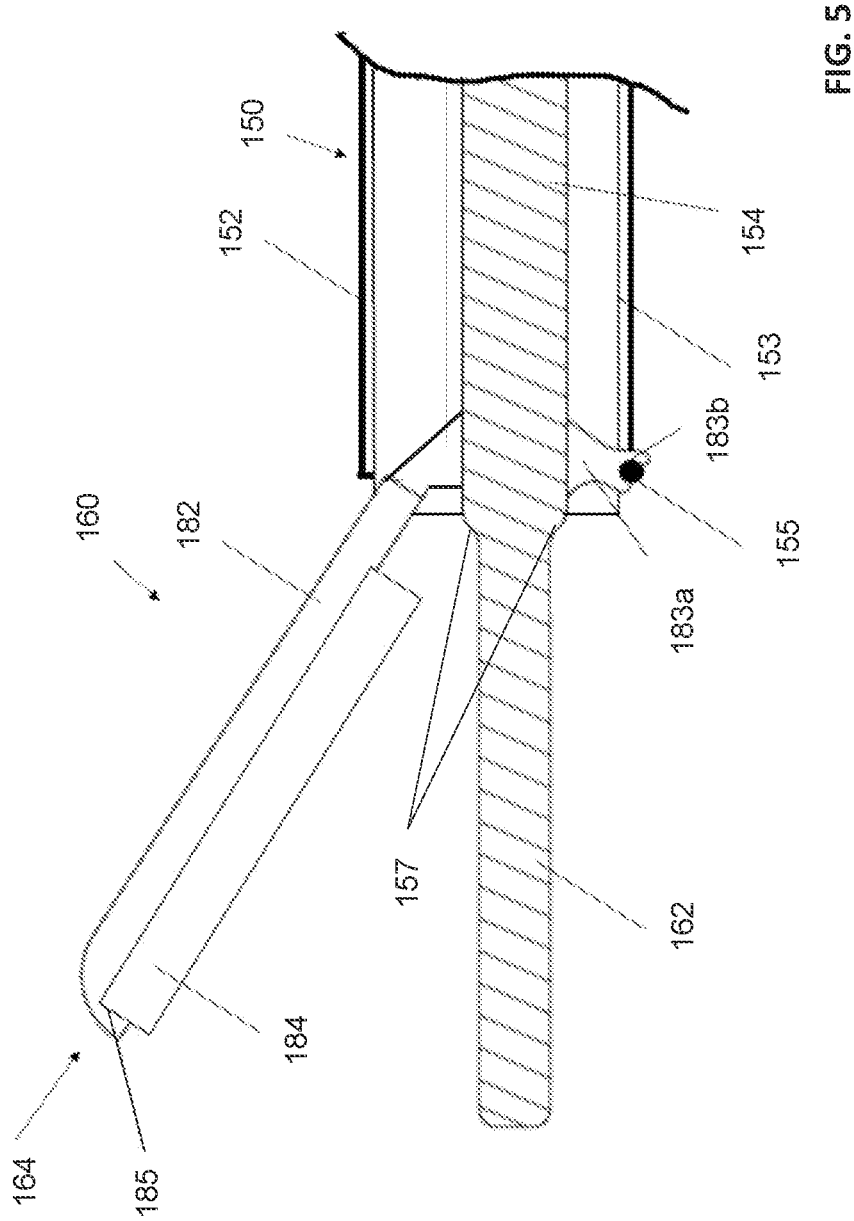

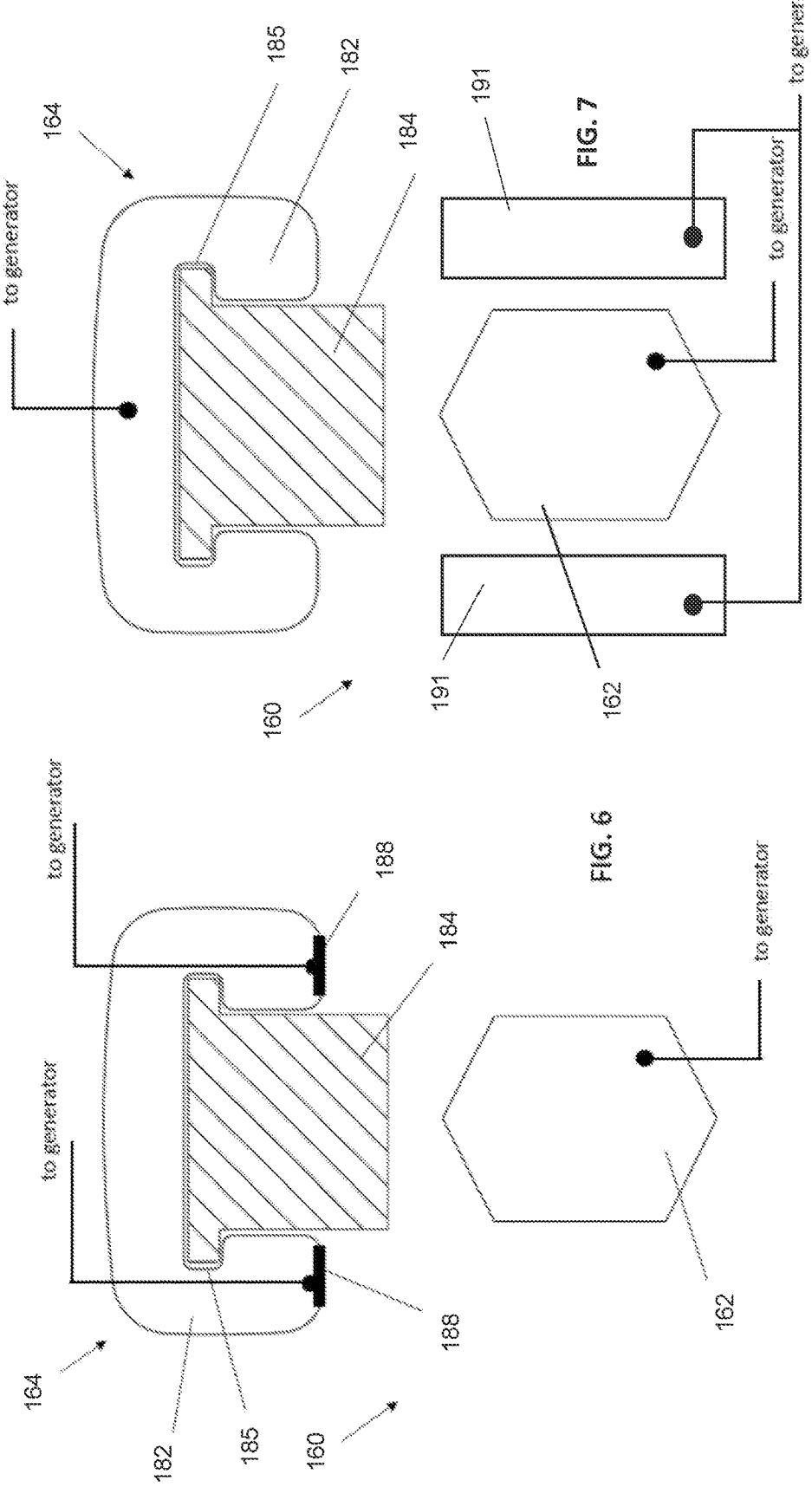

RF Energy
(3 Phase)

SURGICAL INSTRUMENTS, SYSTEMS, AND METHODS INCORPORATING ULTRASONIC AND THREE-PHASE ELECTROSURGICAL FUNCTIONALITY

CROSS-REFERENCE TO RELATED APPLICATION

This application is a 371 National Stage Application of International Application No. PCT/IB2022/054050, filed May 2, 2022, which claims the benefit of, and priority to, U.S. Provisional Patent Application No. 63/189,531, filed on May 17, 2021, the entire contents of each of which are hereby incorporated herein by reference.

FIELD

The present disclosure relates to surgical instruments, systems, and methods. More specifically, the present disclosure relates to surgical instruments, systems, and methods incorporating ultrasonic and three-phase electrosurgical functionality.

BACKGROUND

Ultrasonic surgical instruments and systems utilize ultrasonic energy, i.e., ultrasonic vibrations, to treat tissue. More specifically, ultrasonic surgical instruments and systems utilize mechanical vibration energy transmitted at ultrasonic frequencies to treat tissue. An ultrasonic surgical device may include, for example, an ultrasonic blade and a clamp mechanism to enable clamping of tissue against the blade. Ultrasonic energy transmitted to the blade causes the blade to vibrate at very high frequencies, which allows for heating tissue to treat tissue clamped against or otherwise in contact with the blade.

Electrosurgical instruments and systems conduct Radio Frequency (RF) energy through tissue to treat tissue. Electrosurgical instruments and systems are typically configured to delivery bipolar RF energy or monopolar RF energy. In bipolar RF instruments and systems, bipolar RF energy is conducted between oppositely charged electrodes and through tissue, e.g., tissue clamped between the electrodes or otherwise in contact therewith, to treat tissue. In monopolar RF instruments and systems, monopolar RF energy is delivered from an active electrode to tissue in contact with the electrode, with the energy returning via a remote return electrode device to complete the circuit.

SUMMARY

As used herein, the term "distal" refers to the portion that is described which is farther from an operator (whether a human surgeon or a surgical robot), while the term "proximal" refers to the portion that is being described which is closer to the operator. Terms including "generally," "about," "substantially," and the like, as utilized herein, are meant to encompass variations, e.g., manufacturing tolerances, material tolerances, use and environmental tolerances, measurement variations, and/or other variations, up to and including plus or minus 10 percent. Further, any or all of the aspects described herein, to the extent consistent, may be used in conjunction with any or all of the other aspects described herein.

Provided in accordance with aspects of the present disclosure is a surgical system including an ultrasonic generator configured to provide an ultrasonic drive signal, an ultrasonic transducer coupled to the ultrasonic generator to receive the ultrasonic drive signal therefrom and produce mechanical ultrasonic energy in response thereto, an electrosurgical generator configured to output three-phase Radio Frequency (RF) energy, and an end effector assembly. The end effector assembly includes an ultrasonic blade coupled to the ultrasonic transducer and configured to receive the mechanical ultrasonic energy therefrom. The ultrasonic blade is configured to supply the mechanical ultrasonic energy to tissue in contact with the ultrasonic blade to treat tissue. At least a portion of the ultrasonic blade defines a first electrode. The end effector assembly further includes a second electrode and a third electrode. The first and second electrodes, the first and third electrodes, and the second and third electrodes are electrically coupled to the electrosurgical generator and configured to conduct first, second, and third phases, respectively, of the three-phase RF energy therebetween and through tissue to at least one of treat or interrogate tissue.

In an aspect of the present disclosure, the end effector assembly further includes a jaw member movable relative to the ultrasonic blade to clamp tissue therebetween. In such aspects, the jaw member includes at least one of the second or third electrodes.

In another aspect of the present disclosure, at least one panel extends along at least a portion of a length of the ultrasonic blade in spaced-apart relation relative thereto. In such aspects, the at least one panel includes one of the second or third electrodes.

In yet another aspect of the present disclosure, the electrosurgical generator and the first, second, and third electrodes define a star-delta three-phase transformer configuration.

In still another aspect of the present disclosure, the electrosurgical generator defines a multi-phase bridge driver configuration.

In another aspect of the present disclosure, the system further includes a handle assembly and an elongated assembly extending distally from the handle assembly. In such aspects, the end effector assembly is supported at a distal end of the elongated assembly.

In still yet another aspect of the present disclosure, one or both of the electrosurgical generator or the ultrasonic generator is supported on or within the handle assembly. Additionally or alternatively, a battery assembly is supported on or within the handle assembly.

In an aspect of the present disclosure, the electrosurgical generator is configured to enable at least two of the first, second, or third phases to have different energy parameters, e.g., different power levels.

In another aspect of the present disclosure, the electrosurgical generator is configured to output a tissue treating energy via at least one of the first, second, or third phases and to output a tissue interrogation energy via at least one other of the first, second, or third phases.

In still another aspect of the present disclosure, the electrosurgical generator is configured to commutate the three-phase RF energy output.

In yet another aspect of the present disclosure, the ultrasonic generator and the electrosurgical generator are configured to simultaneously output the ultrasonic drive signal and the three-phase RF energy, respectively, such that the mechanical ultrasonic motion and the three-phase RF energy are simultaneously supplied to tissue for sealing tissue.

In another aspect of the present disclosure, the electrosurgical generator is further configured to interrogate tissue during the simultaneous output to monitor a progress of tissue sealing. More specifically, in aspects, the electrosurgical generator is configured to interrogate tissue via one of the first, second, or third phases during the simultaneous output, and to provide treatment energy during the simultaneous output via another one of the first, second, or third phases.

In still yet another aspect of the present disclosure, the ultrasonic generator and the electrosurgical generator are combined into a single generator.

In another aspect of the present disclosure, the first, second, and third phases are 120 degrees out of phase relative to one another.

A method of surgery provided in accordance with aspects of the present disclosure includes supplying mechanical ultrasonic energy to tissue in contact with an ultrasonic blade to treat tissue and conducting first, second, and third phases of three-phase RF energy between a first electrode defined by the ultrasonic blade and a second electrode and through tissue, between the first electrode and a third electrode and through tissue, and between the second electrode and a third electrode and through tissue, respectively.

In aspects, the conducting includes interrogating tissue via at least one of the first, second, or third phases and treating tissue via at least one other of the first, second, or third phases. Additionally or alternatively, the conducting includes conducting at least two of the first, second, or third phases in accordance with different energy parameters.

BRIEF DESCRIPTION OF THE DRAWINGS

The above and other aspects and features of the present disclosure will become more apparent in light of the following detailed description when taken in conjunction with the accompanying drawings wherein like reference numerals identify similar or identical elements.

FIG. 5 is a longitudinal, cross-sectional view of an end effector assembly of the surgical instrument of FIG. 1;

FIG. 6 is a transverse, cross-sectional view of the end effector assembly of FIG. 5;

FIG. 7 is a transverse, cross-sectional view of another end effector assembly provided in accordance with the present disclosure and configured for use with the surgical instrument of FIG. 1 or any other suitable surgical instrument;

DETAILED DESCRIPTION

Figure 1:
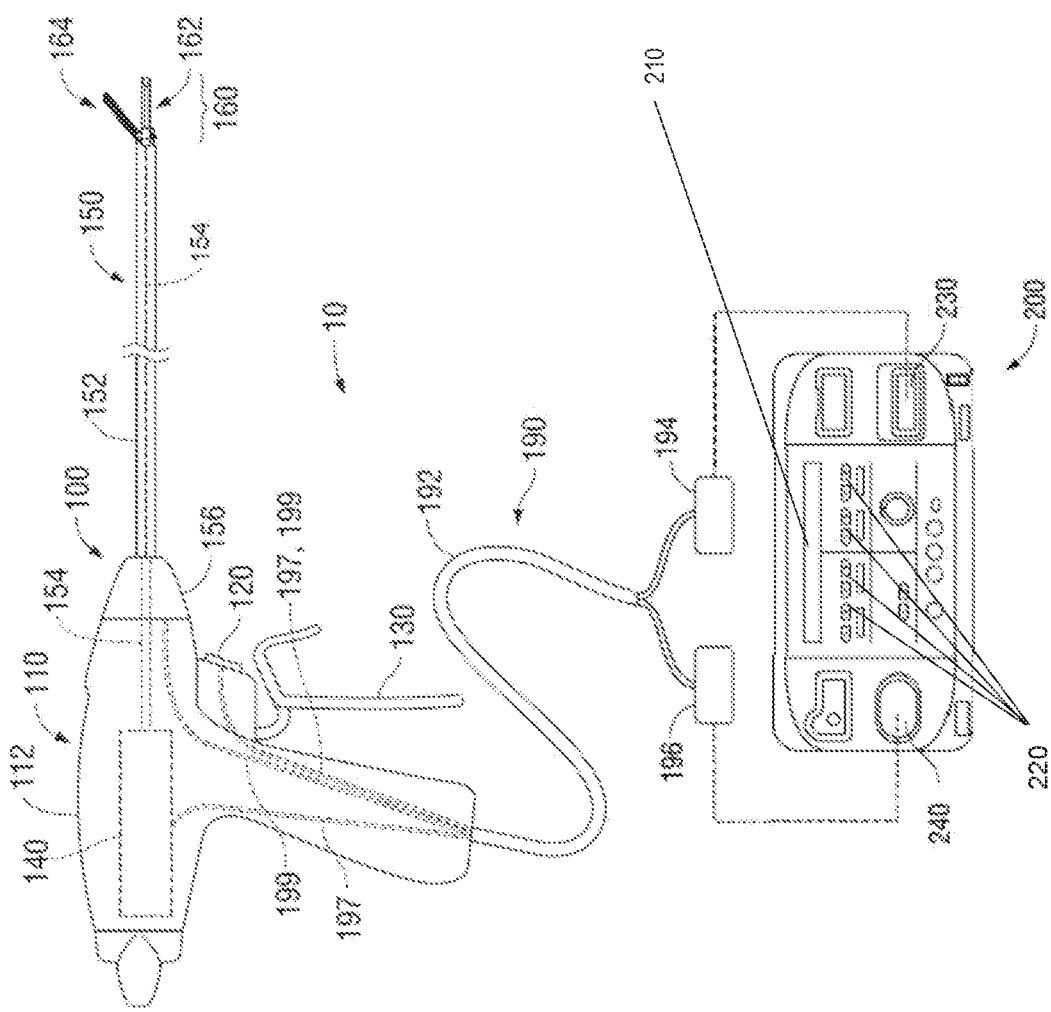
FIG. 1 is a side view of a surgical system provided in accordance with the present disclosure including a surgical instrument, a surgical generator, and a return electrode device.

Referring to FIG. 1, a surgical system provided in accordance with aspects of the present disclosure is shown generally identified by reference numeral 10 including a surgical instrument 100 and a surgical generator 200. Surgical instrument 100 includes a handle assembly 110, an elongated assembly 150 extending distally from handle assembly 110, an end effector assembly 160 disposed at a distal end of elongated assembly 150, and a cable assembly 190 operably coupled with handle assembly 110 and extending therefrom for connection to surgical generator 200.

Surgical generator 200 includes a display 210, a plurality user interface features 220 (e.g., buttons, knobs, touch screens, switches, etc.), an ultrasonic plug port 230, and an electrosurgical plug port 240. Display 210 is configured to display operating parameters, settings, etc. during use and, in aspects, may be configured as a touch-screen display configured to enable input by a user. User interface features 220 enable input by a user such as, for example, to power on surgical generator 200, initiate energy delivery, change settings, manipulate the information shown on display 210, etc. Ports 230, 240 enable connection of surgical generator 200 with surgical instrument 100 for output of ultrasonic and electrosurgical energy, respectively, thereto. Additional ports for other energy outputs, fluid supply (irrigation and/or aspiration), smoke evacuation, etc. are also contemplated. Further, as an alternative to plural dedicated ports (e.g., ports 230, 240), one or more common ports (not shown) may be provided.

Surgical instrument 100 is configured to operate in an electrosurgical mode supplying Radio Frequency (RF) energy to tissue to treat tissue and in an ultrasonic mode supplying ultrasonic energy to tissue to treat tissue. The electrosurgical and ultrasonic modes may operate consecutively, simultaneously, in overlapping or nested temporal relation, and/or in any other suitable configuration. The mode(s) activated; the type of activation(s), e.g., continuous, intermittent, periodic, etc.; and/or the energy level setting, e.g., LOW or sealing power ultrasonic, HIGH or transecting power ultrasonic, sealing RF energy, transecting RF energy, coagulating RF energy, etc., may depend upon a user intent (e.g., sealing vs. transection), a type of tissue, a size (e.g., diameter) of tissue, and/or other factors. Surgical generator 200 is a combined ultrasonic generator and electrosurgical generator, although separate ultrasonic and electrosurgical generators are also contemplated. Surgical generator 200, more specifically, is configured to produce ultrasonic drive signals for output through ultrasonic plug port 230 to surgical instrument 100 to activate surgical instrument 100 in the ultrasonic mode (and to control the ultrasonic mode in accordance with the appropriate energy settings) and to provide electrosurgical energy for output through electrosurgical plug port 240 to activate surgical instrument 100 in the electrosurgical mode (and to control the electrosurgical mode in accordance with the appropriate energy settings).

Continuing with reference to FIG. 1, handle assembly 110 includes a housing 112, an activation button 120, and a clamp lever 130. Housing 112 is configured to support an ultrasonic transducer 140. Ultrasonic transducer 140 may be permanently engaged within housing 112 or removable therefrom. Ultrasonic transducer 140 includes a piezoelectric stack other suitable ultrasonic transducer components electrically coupled to surgical generator 200, e.g., via one or more of first electrical lead wires 197, to enable communication of ultrasonic drive signals to ultrasonic transducer 140 to drive ultrasonic transducer 140 to produce ultrasonic vibration energy that is transmitted along a waveguide 154 of elongated assembly 150 to blade 162 of end effector assembly 160, as detailed below. Feedback and/or control signals may likewise be communicated between ultrasonic transducer 140 and surgical generator 200. Ultrasonic transducer 140, more specifically, may include a stack of piezoelectric elements secured, under pre-compression between proximal and distal end masses or a proximal end mass and an ultrasonic horn with first and second electrodes electrically coupled between piezoelectric elements of the stack of piezoelectric elements to enable energization thereof to produce ultrasonic energy. However, other suitable ultrasonic transducer configurations, including plural transducers and/or non-longitudinal, e.g., torsional, transducers are also contemplated.

Activation button 120 is disposed on housing 112 and coupled to or between ultrasonic transducer 140 and/or surgical generator 200, e.g., via one or more of first electrical lead wires 197, to enable activation of ultrasonic transducer 140 in response to depression of activation button 120. In some configurations, activation button 120 may include an ON/OFF switch. In other configurations, activation button 120 may include multiple actuation switches to enable activation from an OFF position to different actuated positions corresponding to different activation settings, e.g., a first actuated position corresponding to a first activation setting (such as a LOW power or tissue sealing setting) and a second actuated position corresponding to a second activation setting (such as a HIGH power or tissue transection setting). In still other configurations, separate activation buttons may be provided, e.g., a first actuation button for activating a first activation setting and a second activation button for activating a second activation setting. Additional activation buttons, sliders, wheels, etc. are also contemplated to enable control of various different activation settings from housing 112.

Elongated assembly 150 of surgical instrument 100 includes an outer drive sleeve 152, an inner support sleeve 153 (FIG. 5) disposed within outer drive sleeve 152, a waveguide 154 extending through inner support sleeve 153 (FIG. 5), a drive assembly (not shown), and a rotation knob 156. End effector assembly 160 extends distally from elongated assembly 150 and includes a blade 162 and a jaw member 164. Rotation knob 156 is rotatable in either direction to rotate elongated assembly 150 and end effector assembly 160 in either direction relative to handle assembly 110. The drive assembly operably couples a proximal portion of outer drive sleeve 152 to clamp lever 130 of handle assembly 110. A distal portion of outer drive sleeve 152 is operably coupled to jaw member 164 and a distal end of inner support sleeve 153 (FIG. 5) pivotably supports jaw member 164. As such, clamp lever 130 is selectively actuatable to thereby move outer drive sleeve 152 about inner support sleeve 153 (FIG. 5) to pivot jaw member 164 relative to blade 162 of end effector assembly 160 from a spaced apart position to an approximated position for clamping tissue between jaw member 164 and blade 162. The configuration of outer and inner sleeves 152, 153 (FIG. 5) may be reversed, e.g., wherein outer sleeve 152 is the support sleeve and inner sleeve 153 (FIG. 5) is the drive sleeve. Other suitable drive structures as opposed to a sleeve are also contemplated such as, for example, drive rods, drive cables, drive screws, etc.

Referring still to FIG. 1, the drive assembly may be tuned to provide a jaw clamping force, or jaw clamping force within a jaw clamping force range, to tissue clamped between jaw member 164 and blade 162 or may include a force limiting feature whereby the clamping force applied to tissue clamped between jaw member 164 and blade 162 is limited to a particular jaw clamping force or a jaw clamping force within a jaw clamping force range.

Waveguide 154, as noted above, extends from handle assembly 110 through inner sleeve 153 (FIG. 5). Waveguide 154 includes blade 162 disposed at a distal end thereof. Blade 162 may be integrally formed with waveguide 154, separately formed and subsequently attached (permanently or removably) to waveguide 154, or otherwise operably coupled with waveguide 154. Waveguide 154 and/or blade 162 may be formed from titanium, a titanium alloy, or other suitable electrically conductive material(s), although non-conductive materials are also contemplated. Waveguide 154 includes a proximal connector (not shown), e.g., a threaded male connector, configured for engagement, e.g., threaded engagement within a threaded female receiver, of ultrasonic transducer 140 such that ultrasonic motion produced by ultrasonic transducer 140 is transmitted along waveguide 154 to blade 162 for treating tissue clamped between blade 162 and jaw member 164 or positioned adjacent to blade 162.

Cable assembly 190 of surgical instrument 100 includes a cable 192, an ultrasonic plug 194, and an electrosurgical plug 196. Ultrasonic plug 194 is configured for connection with ultrasonic plug port 230 of surgical generator 200 while electrosurgical plug 196 is configured for connection with electrosurgical plug port 240 of surgical generator 200. In configurations where generator 200 includes a common port, cable assembly 190 may include a common plug (not shown) configured to act as both the ultrasonic plug 194 and the electrosurgical plug 196.

Plural first electrical lead wires 197 electrically coupled to ultrasonic plug 194 extend through cable 192 and into handle assembly 110 for electrical connection to ultrasonic transducer 140 and/or activation button 120 to enable the selective supply of ultrasonic drive signals from surgical generator 200 to ultrasonic transducer 140 upon activation of activation button 120 in the ultrasonic mode. With respect to electrosurgical activation, plural electrical lead wires 199 are electrically coupled to electrosurgical plug 196 and extend through cable 192 into handle assembly 110. Each of at least three second electrical lead wires 199 is electrically coupled to one of waveguide 154, jaw member 164 (and/or different portions of jaw member 164), and/or one or both of panels 191 (FIG. 7, in aspects where provided) such that at least three-phase RF energy may be conducted between blade 162, jaw member 164 (and/or different portions of jaw member 164), and/or one or both of panels 191 (FIG. 7, in aspects where provided).

Waveguide 154, jaw member 164 (and/or different portions of jaw member 164), and/or one or both of panels 191 (FIG. 7, in aspects where provided) serve as selectively energizable electrodes to establish plural different RF energy circuits depending upon a particular purpose, feedback data, user input, tissue size and/or type, etc. That is, three-phase RF energy may be utilized in some situations (e.g., wherein there are three differently-energized electrodes); in other situations, bipolar RF energy may be utilized (e.g., wherein there are two differently-energized electrode); and/or in other situations, monopolar RF energy may be utilized (e.g., where a single active electrode is energized and wherein a remote return device (not shown) is utilized to complete the circuit back to surgical generator 200). At least one of the second electrical lead wires 199 is electrically coupled to activation button 120 to enable the selective supply of electrosurgical energy from surgical generator 200 to surgical instrument 100 in a suitable manner (e.g., in the three-phase, bipolar, or monopolar configuration, depending upon a manner of activation and/or the activation button activated (where multiple activation buttons are provided)).

Figure 2:
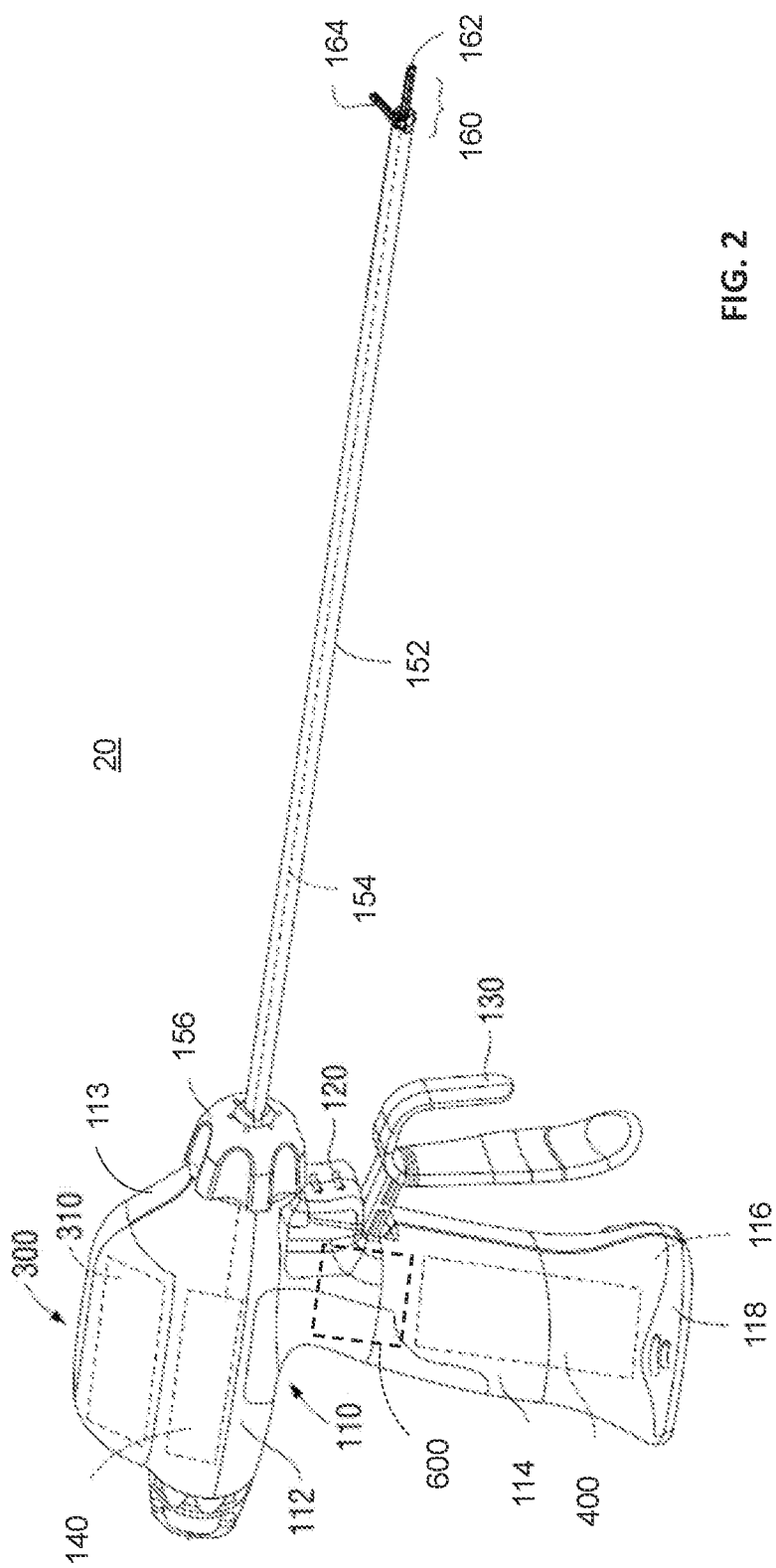
FIG. 2 is perspective view of another surgical system provided in accordance with the present disclosure including a surgical instrument incorporating an ultrasonic generator, electrosurgical generator, and power source therein.

As an alternative to a remote generator 200, surgical system 10 may be at least partially cordless in that it incorporates an ultrasonic generator, an electrosurgical generator, and/or a power source, e.g., a battery, thereon or therein. In this manner, the connections from surgical instrument 100 to external devices, e.g., generator(s) and/or power source(s), is reduced or eliminated. More specifically, with reference to FIG. 2, another surgical system in accordance with the present disclosure is shown illustrated as a surgical instrument 20 supporting an ultrasonic generator 310, a power source (e.g., battery assembly 400), and an electrosurgical generator 600 thereon or therein. Surgical instrument 20 is similar to surgical instrument 100 (FIG. 1) and may include any of the features thereof except as explicitly contradicted below. Accordingly, only differences between surgical instrument 20 and surgical instrument 100 (FIG. 1) are described in detail below while similarities are omitted or summarily described.

Housing 112 of surgical instrument 20 includes a body portion 113 and a fixed handle portion 114 depending from body portion 113. Body portion 113 of housing 112 is configured to support an ultrasonic transducer and generator assembly ("TAG") 300 including ultrasonic generator 310 and ultrasonic transducer 140. TAG 300 may be permanently engaged with body portion 113 of housing 112 or removable therefrom.

Fixed handle portion 114 of housing 112 defines a compartment 116 configured to receive battery assembly 400 and electrosurgical generator 600 and a door 118 configured to enclose compartment 116. An electrical connection assembly (not shown) is disposed within housing 112 and serves to electrically couple activation button 120, ultrasonic generator 310 of TAG 300, and battery assembly 400 with one another when TAG 300 is supported on or in body portion 113 of housing 112 and battery assembly 400 is disposed within compartment 116 of fixed handle portion 114 of housing 112, thus enabling activation of surgical instrument 20 in an ultrasonic mode in response to appropriate actuation of activation button 120. Further, the electrical connection assembly or a different electrical connection assembly disposed within housing 112 serves to electrically couple activation button 120, electrosurgical generator 600, battery assembly 400, and end effector assembly 160 (e.g., blade 162, jaw member 164 (and/or different portions of jaw member 164), and/or one or both of panels 191 (FIG. 7, in aspects where provided)) with one another when electrosurgical generator 600 and battery assembly 400 are disposed within compartment 116 of fixed handle portion 114 of housing 112, thus enabling activation of surgical instrument 20 in an electrosurgical mode, e.g., to deliver three-phase RF energy, bipolar RF energy, or monopolar RF energy, in response to appropriate actuation of one or more activation button(s) 120.

Figure 3A:
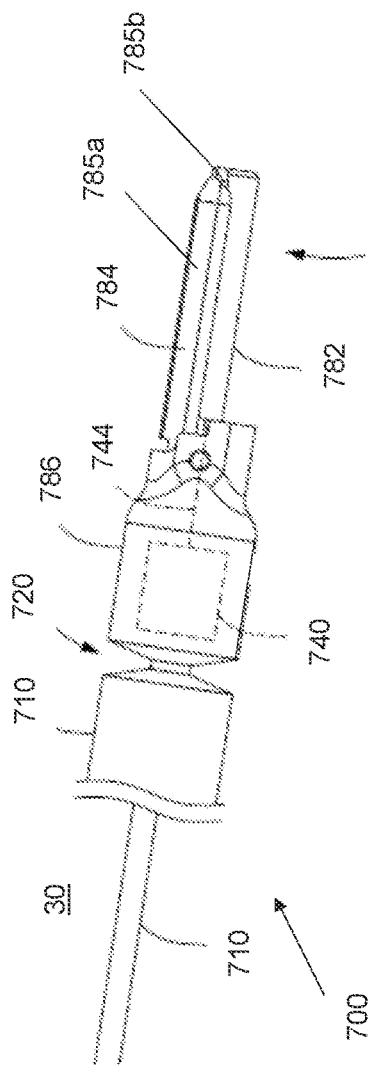
FIGS. 3A and 3B are perspective views of a distal portion of still another surgical instrument provided in accordance with the present disclosure with a distal end portion thereof enlarged and an end effector assembly thereof disposed in un-articulated and articulated positions, respectively.
Figure 3B:
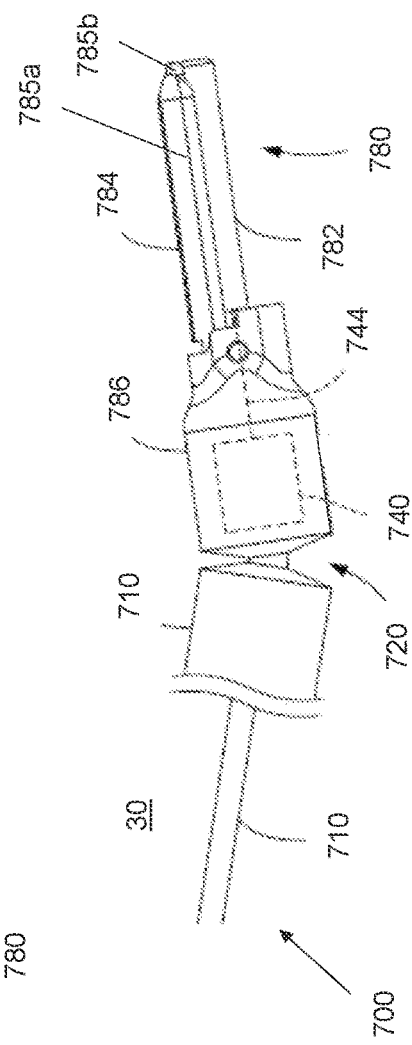

With reference to FIGS. 3A and 3B, a distal portion of another surgical instrument 30 provided in accordance with the present disclosure is shown. Surgical instrument 30 may be configured similar to and include any of the features of surgical instrument 100 (for use with a remote generator 200 as part of system 10) (FIG. 1) or surgical instrument 20 (including ultrasonic and electrosurgical generators 310, 600 and a battery assembly 400 thereon or therein) (FIG. 2), except as explicitly contradicted below. Accordingly, only differences between surgical instrument 30 and surgical instruments 100, 20 (FIGS. 1 and 2, respectively) are described in detail below while similarities are omitted or summarily described.

Surgical instrument 30 includes a housing (not shown, for manual manipulation or attachment to a surgical robot) and an elongated assembly 700 extending distally from the housing. Elongated assembly 700 of surgical instrument 30 includes an elongated shaft 710 having one or more articulating portions 720, an ultrasonic transducer 740, and an end effector assembly 780 including a blade 782, a jaw member 784, and a distal housing 786.

Elongated shaft 710, as noted above, extends distally from the housing. The one or more articulating portions 720 are disposed along at least a portion of elongated shaft 710. More specifically, an articulating portion 720 is shown in FIGS. 3A and 3B in the form of an articulating joint disposed at a distal end portion of elongated shaft 710 and coupled to distal housing 786 of end effector assembly 780 such that articulation of articulating portion 720 relative to a longitudinal axis of elongated shaft 710 articulates end effector assembly 780 relative to the longitudinal axis of elongated shaft 710. However, it is also contemplated that additional or alternative articulating portions may be disposed along some or all of elongated shaft 710 periodically, intermittently, or continuously (for a portion or the entirety of elongated shaft 710). Each articulating portion 720 may include one or more articulation joints, linkages, flexible portions, malleable portions, and/or other suitable articulating structures to enable articulation of end effector assembly 780 relative to the longitudinal axis of elongated shaft 710 in at least one direction, e.g., pitch articulation and/or yaw articulation. In configurations, the one or more articulating portions 720 are configured to enable both pitch articulation and yaw articulation; in other configurations, unlimited articulation in any direction is enabled.

Jaw member 784 is pivotably mounted on and extends distally from distal housing 786. A drive assembly (not shown) of surgical instrument 30 operably couples the actuator, e.g., clamp lever 130 (FIG. 1), with jaw member 784 of end effector assembly 780 by way of a jaw drive (not shown) such that the actuator is selectively actuatable to pivot jaw member 784 relative to distal housing 786 and blade 782 of end effector assembly 780 from an open position to a clamping position for clamping tissue between jaw member 784 and blade 782. The jaw drive may include one or more drive shafts, drive sleeves, drive cables, gears, cams, and/or other suitable components. Jaw member 784 includes a more-rigid structural body 785a, which is pivotably mounted on a distal end portion of distal housing 786, and a more-compliant jaw liner 785b, which is captured by the more-rigid structural body 785b and positioned to oppose blade 782 to enable clamping of tissue therebetween.

Electrical lead wires (not shown) extend through elongated shaft 710 and articulating portion 720 to electrically coupled to ultrasonic horn 744 or blade 782, jaw member 784 (and/or different portions of jaw member 784), and/or one or both of panels 191 (FIG. 7, in aspects where provided) such that three-phase electrosurgical energy may be conducted between blade 782, jaw member 784 (and/or different portions of jaw member 784), and/or one or both of panels 191 (FIG. 7, in aspects where provided).

An articulation assembly (not shown) including gears, pulleys, sleeves, cables, etc. operably couples a proximal articulation actuator (not shown) with articulating portion 720 such that actuation of the proximal articulation actuator manipulates articulating portion 720 to thereby articulate end effector assembly 780 relative to the longitudinal axis of elongated shaft 710.

Continuing with reference to FIGS. 3A and 3B, an ultrasonic transducer 740 is disposed within distal housing 786 and positioned distally of articulating portion 720, an ultrasonic horn 744 extends distally from ultrasonic transducer 740, and blade 782 extends distally from ultrasonic horn 744. Thus, in contrast to surgical instruments 100, 20 (FIGS. 1 and 2, respectively), ultrasonic transducer 740 is disposed within distal housing 786 distally of articulating portion 720 rather than proximally in the housing of the instrument. Alternatively, ultrasonic transducer 740 may be positioned proximally of articulating portion 720 (in the housing or otherwise positioned), and a waveguide (not shown) including one or more articulating portions, e.g., flexible portions, joint portions, linkage portions, etc., may extend through articulating portion 720 and interconnect ultrasonic transducer 740 with blade 782 such that ultrasonic energy produced by ultrasonic transducer 740 can be transmitted along the waveguide to blade 782 regardless of the articulation of articulating portion 720.

In some configurations, distal housing 786, including ultrasonic transducer 740 therein, defines an outer diameter less than about 15 mm, less than about 12 mm, less than about 10 mm, less than about 8 mm, less than about 5 mm, or less than about 3 mm. As such, ultrasonic transducer 740, in such configurations, may define a sufficiently small diameter (for example, 10% less than the diameters above) so as to enable operable receipt within distal housings 786 of the above-noted dimensions, respectively. By providing a configuration with the above-noted outer diameters, surgical instrument 30 may be utilized minimally-invasively through standard sizes of access devices. Ultrasonic transducer 740, other than its overall size, may be configured similar to ultrasonic transducer 140 (FIG. 1) or any other suitable ultrasonic transducer. For example, ultrasonic transducer 740 may include a stack of piezoelectric elements secured, under pre-compression between a proximal end mass and ultrasonic horn 744 with first and second electrodes electrically coupled between piezoelectric elements of the stack of piezoelectric elements to enable energization thereof to produce ultrasonic energy. Electrical lead wires (not shown) connect the electrodes of ultrasonic transducer 740 with an ultrasonic generator (not shown) to enable an electrical drive signal generated by the ultrasonic generator to be imparted to the stack of piezoelectric elements of ultrasonic transducer 740 to energize the stack of piezoelectric elements to produce ultrasonic energy for transmission to blade 782 via ultrasonic horn 744.

Figure 4:
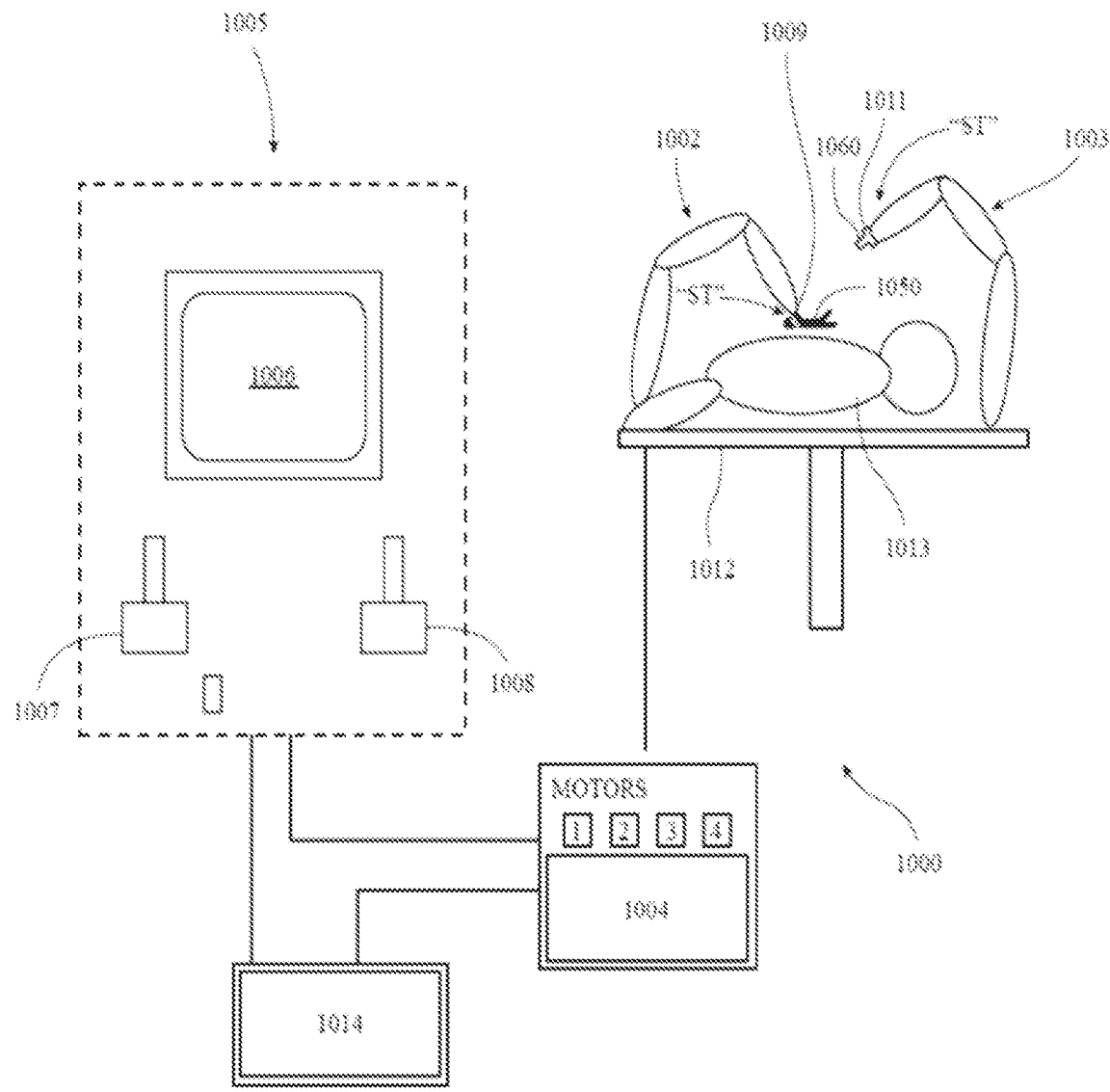
FIG. 4 is a schematic illustration of a robotic surgical system provided in accordance with the present disclosure.

Turning to FIG. 4, a robotic surgical system in accordance with the aspects and features of the present disclosure is shown generally identified by reference numeral 1000. For the purposes herein, robotic surgical system 1000 is generally described. Aspects and features of robotic surgical system 1000 not germane to the understanding of the present disclosure are omitted to avoid obscuring the aspects and features of the present disclosure in unnecessary detail.

Robotic surgical system 1000 generally includes a plurality of robot arms 1002, 1003; a control device 1004; and an operating console 1005 coupled with control device 1004. Operating console 1005 may include a display device 1006, which may be set up in particular to display three dimensional images; and manual input devices 1007, 1008, by means of which a person (not shown), for example a surgeon, may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and an attaching device 1009, 1011, to which may be attached, for example, a surgical tool "ST" supporting an end effector 1050, 1060. One of the surgical tools "ST" may be surgical instrument 100 (FIG. 1), surgical instrument 20 (FIG. 2), or surgical instrument 30 (FIGS. 3A and 3B), e.g., configured for use in both an ultrasonic mode and an electrosurgical mode, wherein manual actuation features, e.g., actuation button 120 (FIG. 1), clamp lever 130 (FIG. 1), the proximal articulation actuator, etc., are replaced with robotic inputs. In such configurations, robotic surgical system 1000 may include or be configured to connect to an ultrasonic generator, an electrosurgical generator, and/or a power source. The other surgical tool "ST" may include any other suitable surgical instrument, e.g., an endoscopic camera, other surgical tool, etc. Robot arms 1002, 1003 may be driven by electric drives, e.g., motors, that are connected to control device 1004. Control device 1004 (e.g., a computer) may be configured to activate the motors, in particular by means of a computer program, in such a way that robot arms 1002, 1003, their attaching devices 1009, 1011, and, thus, the surgical tools "ST" execute a desired movement and/or function according to a corresponding input from manual input devices 1007, 1008, respectively. Control device 1004 may also be configured in such a way that it regulates the movement of robot arms 1002, 1003 and/or of the motors.

Referring to FIGS. 5 and 6, end effector assembly 160 of surgical instrument 100 of surgical system 10 (FIG. 1) is detailed, although the aspects and features of end effector assembly 160 may similarly apply, to the extent consistent, to surgical instrument 20 (FIG. 2), surgical instrument 30 (FIGS. 3A and 3B), and/or any other suitable surgical instrument or system. End effector assembly 160, as noted above, includes blade 162 and jaw member 164. Blade 162 may define a linear configuration, may define a curved configuration, or may define any other suitable configuration, e.g., straight and/or curved surfaces, portions, and/or sections; one or more convex and/or concave surfaces, portions, and/or sections; etc. With respect to curved configurations, blade 162, more specifically, may be curved in any direction relative to jaw member 164, for example, such that the distal tip of blade 162 is curved towards jaw member 164, away from jaw member 164, or laterally (in either direction) relative to jaw member 164. Further, blade 162 may be formed to include multiple curves in similar directions, multiple curves in different directions within a single plane, and/or multiple curves in different directions in different planes. In addition, blade 162 may additionally or alternatively be formed to include any suitable features, e.g., a tapered configuration, various different cross-sectional configurations along its length, cut outs, indents, edges, protrusions, straight surfaces, curved surfaces, angled surfaces, wide edges, narrow edges, and/or other features.

Blade 162 may define a polygonal, rounded polygonal, or any other suitable cross-sectional configuration(s) and/or the cross-section thereof may vary along the length of blade 162. Waveguide 154 or at least the portion of waveguide 154 proximally adjacent blade 162, may define a cylindrical shaped configuration. Plural tapered surfaces 157 may interconnect the cylindrically shaped waveguide 154 with the polygonal (rounded edge polygonal, or other suitable shape) configuration of blade 162 to define smooth transitions between the body of waveguide 154 and blade 162.

Blade 162 may be wholly or selectively coated with a suitable material, e.g., a non-stick material, an electrically insulative material, an electrically conductive material, combinations thereof, etc. Suitable coatings and/or methods of applying coatings include but are not limited to Teflon®, polyphenylene oxide (PPO), deposited liquid ceramic insulative coatings; thermally sprayed coatings, e.g., thermally sprayed ceramic; Plasma Electrolytic Oxidation (PEO) coatings; anodization coatings; sputtered coatings, e.g., silica; ElectroBond® coating available from Surface Solutions Group of Chicago. IL. USA; or other suitable coatings and/or methods of applying coatings. Blade 162, as noted above, in addition to receiving ultrasonic energy transmitted along waveguide 154 from ultrasonic transducer 140 (FIG. 1), is adapted to connect to generator 200 (FIG. 1) to enable the supply of RF energy to blade 162 for conduction from at least a portion of blade 162 (e.g., the entirety, the uncoated portion, the coated portion etc.) to tissue in contact therewith.

Continuing with reference to FIGS. 5 and 6, jaw member 164 of end effector assembly 160 includes more rigid structural body 182 and more compliant jaw liner 184. Structural body 182 includes a pair of proximal flanges 183a that are pivotably coupled to the inner support sleeve 153 via receipt of pivot bosses (not shown) of proximal flanges 183a within corresponding openings (not shown) defined within the inner support sleeve 153 and operably coupled with outer drive sleeve 152 via a drive pin 155 secured relative to outer drive sleeve 152 and pivotably received within apertures 183b defined within proximal flanges 183a. As such, sliding of outer drive sleeve 152 about inner support sleeve 153 pivots jaw member 164 relative to blade 162 from a spaced apart position to an approximated position to clamp tissue between jaw liner 184 of jaw member 164 and blade 162.

Structural body 182 may be formed from or embedded at least partially in an insulative material, e.g., an overmolded plastic. In such configurations, electrically conductive surfaces 188. e.g., in the form of plates, may be disposed on or captured by the insulative material to define electrodes on either side of jaw liner 184 on the blade facing side of jaw member 164. Electrically conductive surfaces 188, in such aspects, are connected to generator 200 (FIG. 1) collectively or separately. More specifically, electrically conductive surfaces 188 may be electrically isolated from one another, and may be selectively energizable differently from one another such that blade 162 and the two electrically conductive surfaces 188 define a three-phase RF circuit. Alternatively, electrically conductive surfaces 188 may be electrically coupled and energizable together to serve as one electrode in a monopolar, bipolar, or three-phase RF circuit. In aspects, electrically conductive surfaces 188 are disposed at additional or alternative locations on jaw member 164. e.g., along either or both sides thereof, along a back surface thereof, at a distal tip thereof, etc.

Jaw liner 184 is shaped complementary to a cavity 185 defined within structural body 182, e.g., defining a T-shaped configuration (see FIG. 6), to facilitate receipt and retention therein, although other configurations are also contemplated. Jaw liner 184 is fabricated from an electrically insulative, compliant material such as, for example, polytetrafluoroethylene (PTFE). The compliance of jaw liner 184 enables blade 162 to vibrate while in contact with jaw liner 184 without damaging components of ultrasonic surgical instrument 100 (FIG. 1) and without compromising the hold on tissue clamped between jaw member 164 and blade 162. Jaw liner 184 extends from structural body 182 towards blade 162 such that, together with the insulation of jaw liner 184, electrical connection between electrically conductive surfaces 188 and blade 162 in the approximated position of jaw member 164 is inhibited, thereby inhibiting shorting.

With reference to FIG. 7, in aspects, as an alternative or in addition to jaw member 164 including isolated electrically-conductive portions that are selectively energizable, as detailed above, structural body 182 (in its entirety or a single electrically-conductive portion or surface thereof) may be adapted to connect to a source of electrosurgical energy, e.g., generator 200 (FIG. 1), and end effector assembly 160 may include one or more auxiliary electrode structure(s). Thus, structural body 182, blade 162, and the one or more auxiliary electrode structure(s) enable establishment of a three-phase RF circuit. The one or more auxiliary electrode structures may be, for example, first and second panels 191 extending distally on either side of blade 162 (along at least a portion of a length of blade 162) in laterally-spaced relation relative thereto such that the spaces between panels 191 and blade 162 form thermally-insulating air gaps therebetween. Panels 191 may define relatively thin, plate-like configurations disposed in vertical orientation such that the height dimensions thereof extend parallel relative to an axis of motion of jaw member 164 between the spaced-apart and approximated positions, and such that the width dimensions thereof extend perpendicular relative to the axis of motion of jaw member 164 between the spaced-apart and approximated positions. In aspects, panels 191 are flared outwardly away from blade 162 or inwardly towards blade 162 whereby the flared portions of panels 191 define tissue-contacting surfaces of greater surface area. In such aspects, the flared portions of panels 191 may extend generally perpendicularly relative to the vertical body portions of panels 191 such that the tissue-contacting surfaces thereof are generally parallel with the electrically-conductive surfaces defined by structural body 182 of jaw member 164 on either side of jaw liner 184.

Other suitable auxiliary electrode structures include, for example, a U-shaped sheath extending along at least a portion of the length of and partially surrounding blade 162, one or more electrode probes extending on either (or both) lateral sides of blade 162 or along an underside thereof, additional electrode portion(s) and/or surface(s) operably coupled (fixed or deployable) to jaw member 164, etc. Additional configurations of panels 191 as well as other exemplary auxiliary electrode structures and other end effector assembly arrangements suitable for use in accordance with the present disclosure may be found in, for example and without limitation, International Patent Application No. PCT/US2020/024732, filed on Mar. 25, 2020, the entire contents of which are hereby incorporated herein by reference.

Figure 8:
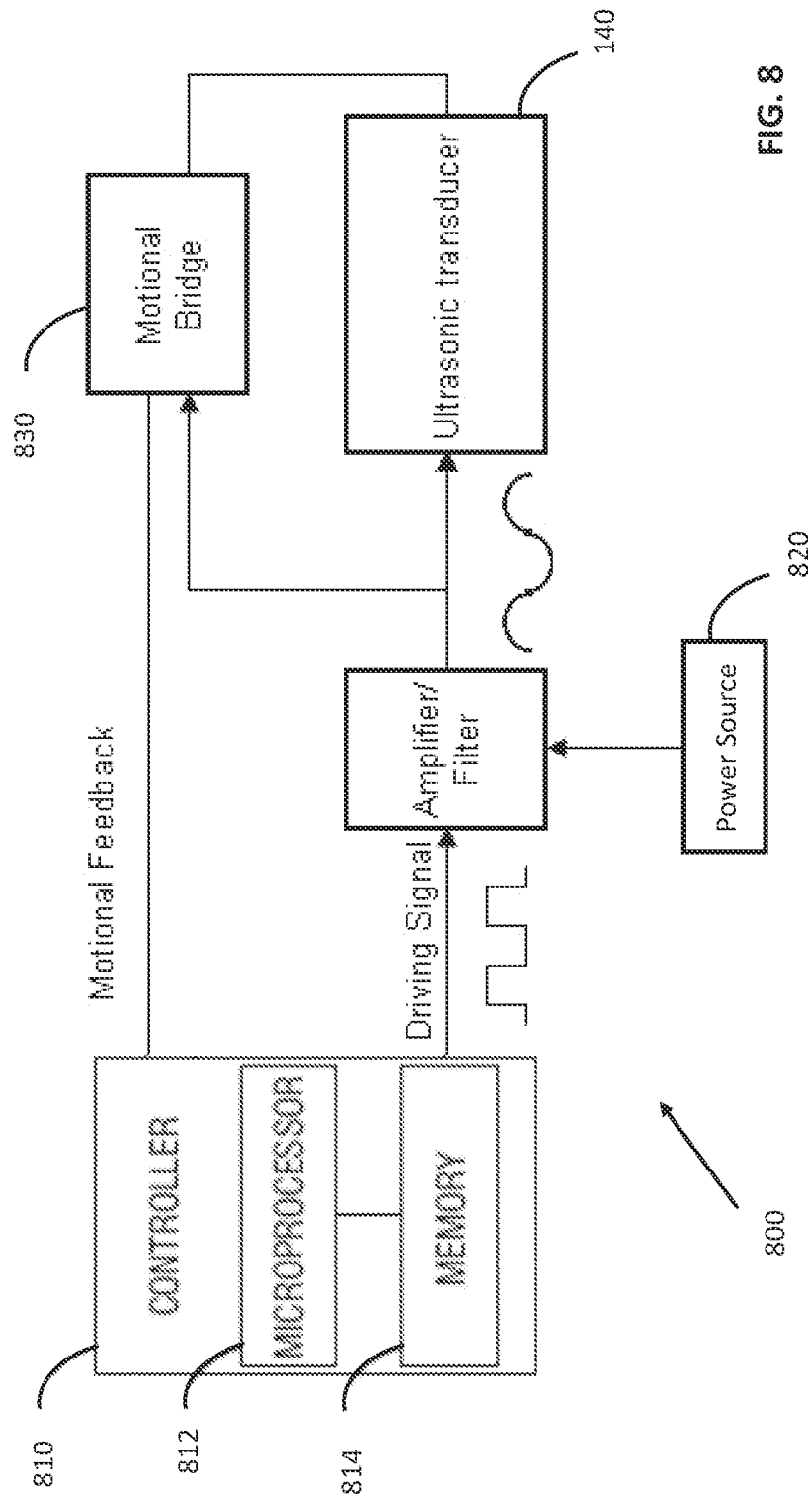
FIG. 8 is a block diagram of an ultrasonic control system configured for use in accordance with the present disclosure.

Turning to FIG. 8, an ultrasonic control system 800 of surgical instrument 100 of surgical system 10 (see FIG. 1) is detailed, although the aspects and features of ultrasonic control system 800 may similarly apply, to the extent consistent, to surgical instrument 20 (FIG. 2), surgical instrument 30 (FIGS. 3A and 3B), and/or any other suitable surgical instrument or system. Ultrasonic control system 800 includes a controller 810 (e.g., of generator 200 (FIG. 1), ultrasonic generator 310 (FIG. 2), or any other suitable generator) and a power source 820 (e.g., generator 200 (FIG. 1), battery 400 (FIG. 2), or any other suitable power source) configured to control and power the electrical input to the ultrasonic transducer 140. Controller 810, more specifically, includes a microprocessor 812 and memory 814, e.g., storing instructions to be executed by microprocessor 812 to control the ultrasonic drive signal provided to ultrasonic transducer 140.

Ultrasonic control system 800 further includes a motional bridge 830 configured to sense a mechanical motion, e.g., a magnitude and frequency of mechanical motion, of ultrasonic transducer 140. As an alternative to a motional bridge 830, mechanical motion can be determined in any other suitable manner, e.g., based on voltage and current sensing. The mechanical motion feedback provided by motional bridge 830 (or other suitable feedback mechanism) to controller 810 enables the controller 810 to control the frequency and/or magnitude of the driving signal, e.g., the high voltage AC driving signal, provided to ultrasonic transducer 140 to achieve a target amount of mechanical motion of ultrasonic transducer 140 at its resonance frequency. Controller 810 is also configured to monitor the resonant frequency of ultrasonic transducer 140, which varies throughout use such as, for example, due to changes in load applied to blade 162 (FIG. 5), temperature of blade 162 (FIG. 5), and/or other factors.

Figure 9:
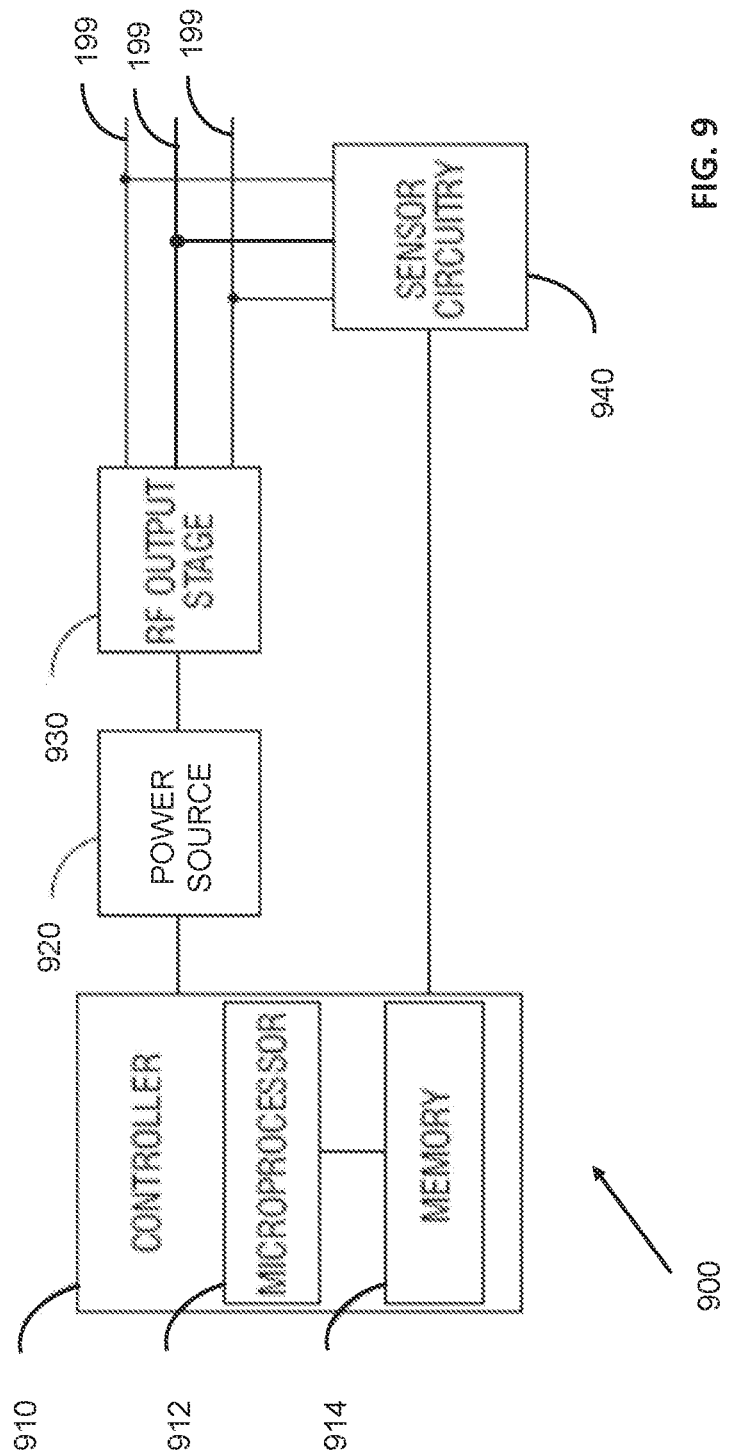
FIG. 9 is a block diagram of an electrosurgical control system configured for use in accordance with the present disclosure.

Referring to FIG. 9, in conjunction with FIGS. 5 and 6, an electrosurgical control system 900 of surgical instrument 100 of surgical system 10 (see FIG. 1) is detailed, although the aspects and features of electrosurgical control system 900 may similarly apply, to the extent consistent, to surgical instrument 20 (FIG. 2) and/or any other suitable surgical instrument or system. Electrosurgical control system 900 includes a controller 910 (e.g., of generator 200 (FIG. 1), electrosurgical generator 600 (FIG. 2), or any other suitable generator), a power source 920 (e.g., generator 200 (FIG. 1), battery 400 (FIG. 2), or any other suitable power source), an RF output stage 930, and sensor circuitry 940. Controller 910 includes a microprocessor 912 and memory 914, e.g., storing instructions to be executed by microprocessor 912 to control the electrosurgical energy output by RF output stage 930. Controller 910 (and/or microprocessor 912 and/or memory 914) may be the same controller 810 (and/or microprocessor 812 and/or memory 814) utilized in the ultrasonic control system 800 (FIG. 8) or may be a separate controller 910 (and/or microprocessor 912 and/or memory 914). Likewise, power source 920 may be the same power source 820 utilized in the ultrasonic control system 800 (FIG. 8) or may be a separate power source 920.

RF output stage 930 is configured to selectively supply electrosurgical energy, via lead wires 199 (and/or other suitable electrical conductive structures), to three (or more) different electrodes, two different electrodes, or a single electrode of end effector assembly 160 (e.g., jaw member 164, a portion of jaw member 164, blade 162, and/or panels 191 (FIG. 7, in aspects where provided)), thus enabling activation in a three-phase (e.g., three wire three-phase) configuration, a bipolar (e.g., two wire single-phase) configuration, or a monopolar configuration. Other poly-phase configurations are also contemplated such as, for example, six-phase (with 4 different electrodes), ten-phase (with 5 different electrodes), etc., with the corresponding number of electrodes and wires 199 to enable such poly-phase configurations. Thus, where reference is made herein to a three-phase configuration, it is understood and contemplated by the present disclosure that other poly-phase configurations may alternatively be used.

Sensor circuitry 940 is operably coupled to wires 199 so as to sense electrical parameters of the energy delivered to end effector assembly 160, e.g., voltage, current, resistance, etc. thereof, and, based thereon, determine one or more parameters of tissue, e.g., impedance of tissue, which can be utilized to determine whether tissue is sufficiently sealed (or a stage of tissue in the tissue sealing process), transected, or otherwise treated. Sensor circuitry 940 provides feedback, e.g., based on the sensed electrical parameter(s), to controller 910 and/or controller 810 of ultrasonic control system 800 (FIG. 8), which, in turn, select an energy-delivery algorithm, modify an energy-delivery algorithm, adjust energy-delivery parameters, and/or output information to the user based thereon. In three-phase (or other poly-phase) configurations, sensor circuitry 940 is capable of sensing electrical parameters from each of the phases, e.g., the energy path between the first and second electrodes, the first and third electrodes, and/or the second and third electrodes.

Figure 10:
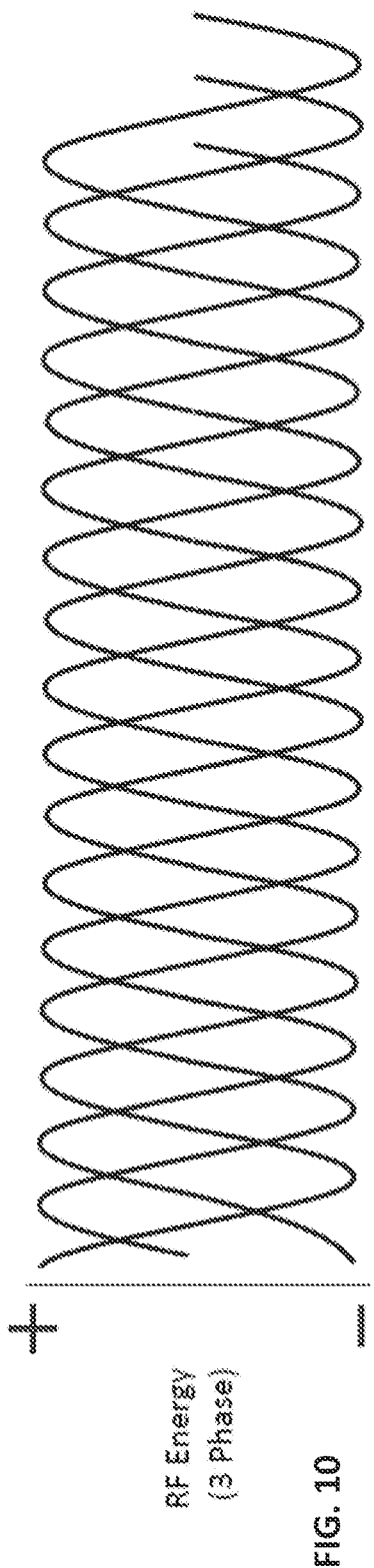
FIG. 10 is a graph of voltage versus time for a three-phase RF circuit in accordance with the present disclosure.

With additional reference to FIG. 10, in three-phase configurations, RF output stage 930 is configured to supply RF energy through three different energy paths defined between the three or more different electrodes such that each energy path provides an oscillating power output that is 120 degrees out of phase with the others energy paths. For example, referring also to FIG. 6, a first energy path of a first phase may be conducted between a first of the electrically-conductive surfaces 188 and blade 162, a second energy path of a second phase may be conducted between a second of the electrically-conductive surfaces 188 and blade 162, and a third energy path of a third phase may be conducted between the first and second electrically-conductive surfaces 188. As another example, referring also to FIG. 7, a first energy path of a first phase may be conducted between structural body 182 of jaw member 164 and blade 162, a second energy path of a second phase may be conducted between structural body 182 of jaw member 164 and panels 191, and a third energy path of a third phase may be conducted between blade 162 and panels 191.

Figure 11:
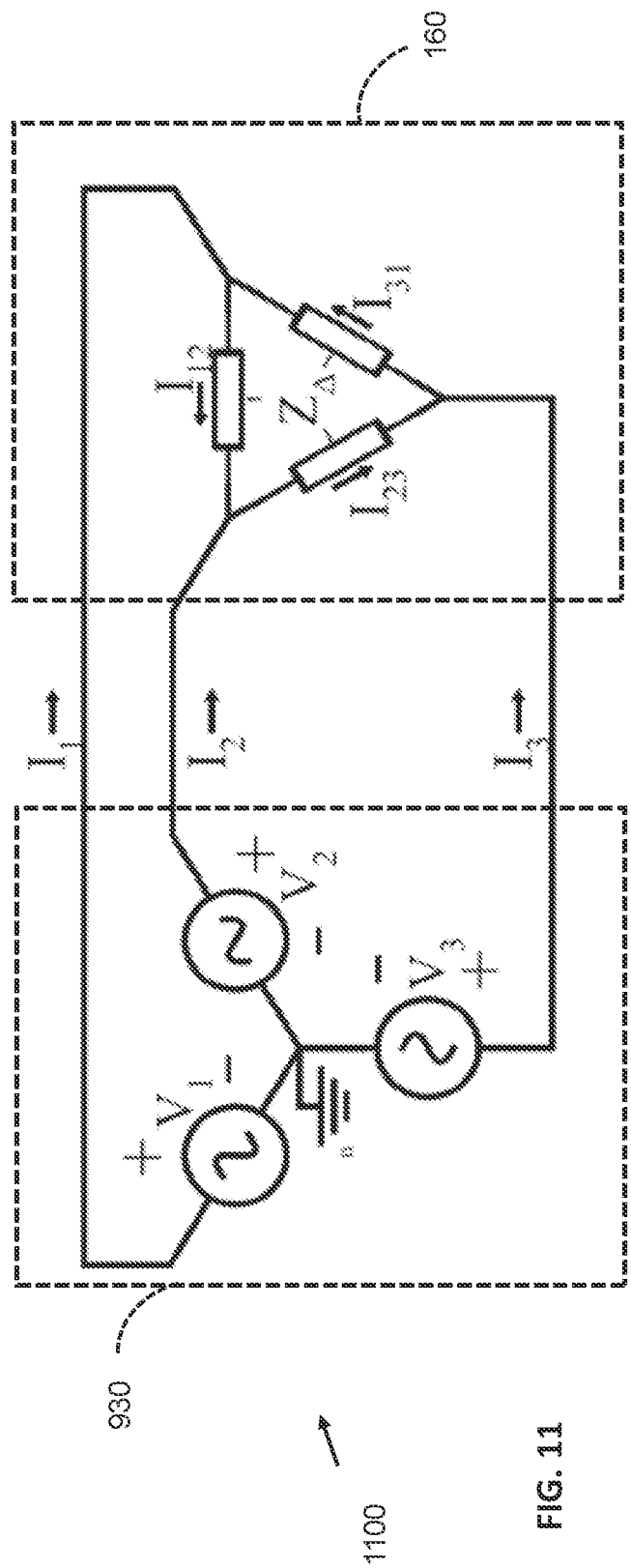
FIG. 11 is a schematic illustration of a star-delta three-phase RF circuit configuration in accordance with the present disclosure.
Figure 12:
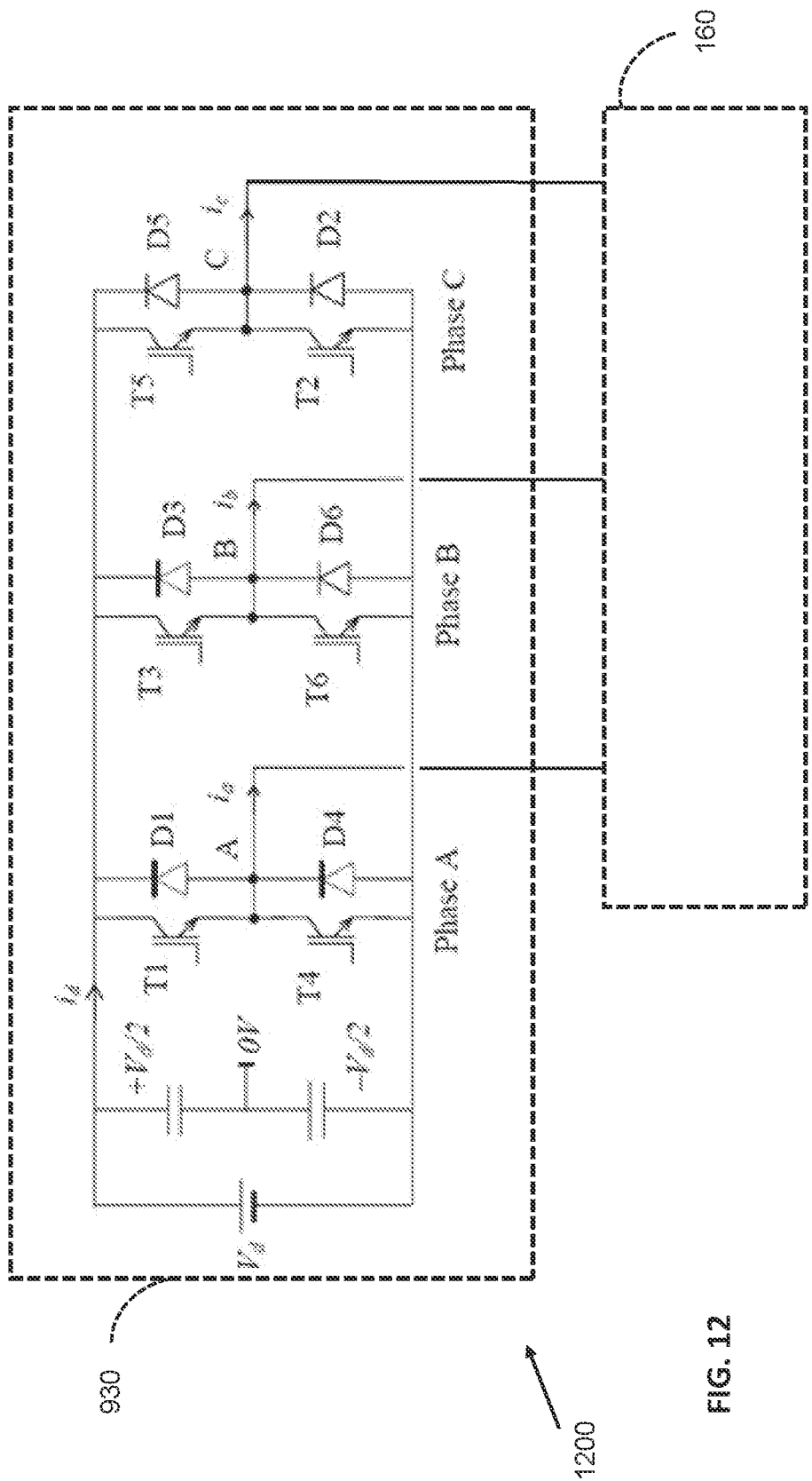
FIG. 12 is a schematic illustration of a star-delta three-phase transistor based bridge driver configured for use in accordance with the present disclosure.

Referring also to FIG. 11, three-phase RF energy may be implemented, for example, using a star-delta three-phase transformer configuration 1100, wherein the primary side, e.g., RF output stage 930, defines a star or Y-arrangement (wherein a center point of the star is neutral) and wherein the secondary side, e.g., the three different electrodes of end effector assembly 160, define a delta arrangement. Turning to FIG. 12, three-phase RF energy may be implemented, as another example, using a multi-phase bridge driver configuration 1200 incorporating transistors of a three-phase driven bridge inverter. This bridge circuitry may form or be incorporated into RF output stage 930 to provide suitable outputs to the three different electrodes of end effector assembly 160. In aspects, the drive signals to the three electrodes may define linear sinusoidal signatures; in other aspects, the transistors of the bridge provide square wave signatures. In additional or alternative aspects, the bridge circuitry may be utilized to duty cycle the bridge elements or alternate pairs of elements to enable different signatures. Such may enable power reduction in the duty cycle and/or higher power pulsed operation, e.g., for larger impedance loads such as, for example, larger tissue structures and/or certain types of tissue. Further still, in the above or other implementations, the three-phase energy may be commutated in a revolving, alternating, or other suitable manner between the elements.

Other suitable configurations for implementing three-phase RF energy are also contemplated, such as a standard "Y" or delta configuration.

Returning to FIGS. 6 and 9-12, with respect to three-phase (or other poly-phase) configurations, conducting energy through tissue utilizing the three phases of energy at the same time delivers a higher energy density to the tissue and improves heating of the tissue, thus facilitating formation of a tissue seal across the entire treatment area (e.g., the area between the jaw member and blade (or auxiliary electrode structure)) and/or reducing sealing times. Further, three-phase energy allows for a higher average power and more constant power delivered to tissue, without having to increase the supply voltage. When three-phase energy is utilized concurrently with ultrasonic energy delivery, the overall heating rate of tissue is further increased, thus further facilitating effective and efficient formation of a tissue seal. Three-phase energy and/or ultrasonic energy may be utilized in any suitable manner based upon the tissue size, tissue type, feedback data, tissue effect (e.g., sealing, transecting, etc.) to be achieved, user setting, or other factors. For example, three-phase energy and/or ultrasonic energy may be utilized, without limitation, as described with respect to the use of RF energy and/or ultrasonic energy in International Patent Application No. PCT/US2021/021902, filed on Mar. 11, 2021, the entire contents of which are hereby incorporated herein by reference.

The three-phase energy (whether utilized alone or in combination with ultrasonic energy) may also be modified for a particular purpose, based on feedback data, and/or for other reasons. For example, output stage 930, in aspects, may be configured to separately control the supply RF energy through each of the three energy paths defined between the three or more different electrodes such that at least one energy path may have different parameters, e.g., voltage, current, power, etc., as compared to at least one other energy path. In such aspects, for example, one path may be set as a higher power path, while the other paths are set as lower power paths (similar or different from one another). Additionally or alternatively, energy output through one or more of the paths may be selectively stopped or started differently from the energy output through one or more other paths. In this manner, by selectively varying and/or turning ON/OFF the energy output through one or more of the energy paths in the three-phase configuration, energy delivery through tissue or different portions of the tissue can be customized such as, for example, to achieve uniform and consistent tissue heating to achieve a tissue seal even where the tissue thickness varies, the tissue composition varies, the clamping force on the tissue varies, etc. This customizable energy delivery feature may also be utilized for other purposes such as, for example, spot treatment (with additional energy) of a particular area, increasing the heating at the blade for or in preparation for transection after sealing, etc.

Further, by selectively varying and/or turning ON/OFF the energy output through one or more of the energy paths in the three-phase configuration different, a desired tissue effect may be facilitated. For example, and without limitation, substantially vertical energy paths, e.g., wherein energy is transmitted vertically through tissue such as, for example, between the jaw member and blade and/or the auxiliary structures and jaw member, may be utilized for tissue sealing while substantially horizontal paths wherein energy is transmitted horizontally through tissue such as, for example, between different electrodes of the jaw member, between the blade and an auxiliary structure(s), and/or between different electrodes of the auxiliary structure(s), may be utilized for tissue transection, although the opposite or other configurations are also contemplated.

In addition or as an alternative to electrosurgical control system 900 controlling the supply of electrosurgical energy in a three-phase configuration to treat tissue, electrosurgical control system 900 may also be configured to supply energy to tissue in the three-phase configuration to interrogate tissue, e.g., wherein sensor circuitry 940 senses one or more electrical parameters to provide feedback to controller 910 such as, for example, to enable determination of the impedance of tissue. Tissue interrogation may be initiated in all three phases of the three-phase configuration simultaneously or using only one or two phases (continuously, intermittently (switching between treatment and interrogation signals), etc.), while the other phases are turned off and/or are utilized to supply tissue treating energy. In aspects, electrosurgical interrogation may be performed in the absence of any treatment energy, e.g., with the ultrasonic energy turned off, e.g., to assess tissue before treatment (e.g., to determine a type of treatment, a suitable energy delivery algorithm, and/or suitable energy delivery parameter), after treatment (e.g., to determine completion of tissue treatment and/or a state of treated or surrounding tissue), during treatment, or in other circumstances. The ability to utilize two or more phases for tissue interrogation, regardless of when interrogation is performed, provides the ability to obtain additional insights into the tissue being interrogated, e.g., by comparison of interrogation results from different energy paths of the three-phase configuration. Additionally, a three-phase configuration enables a dedicated tissue interrogation path to be utilized simultaneously with the delivery of tissue treatment energy via another path (in aspects, the interrogation and tissue treatment energy paths may be rotated, switched, etc. during use without interrupting tissue treatment) and/or different interrogation signals to be utilized via different paths. The interrogation signals may be continuous, a pulse, or a plurality of pulses.

Regardless of the particular timing(s) and/or manner(s) of interrogation, electrosurgical control system 900 is configured to evaluate the returned interrogation signal(s), e.g., the voltage, current, resistance, etc. thereof, and, based thereon, determine one or more parameters of tissue, e.g., the impedance of tissue, temperature of tissue, type of tissue, etc. Additional details of tissue interrogation suitable for use with the three-phase configurations of the present disclosure are described, without limitation, in International Patent Application No. PCT/US2020/024732, previously incorporated herein by reference in its entirety.

Additional information obtainable from dedicated interrogation pathways and/or sensing electrical parameters from tissue treatment energy include, for example: determining whether there is an imbalance in the tissue seal being created (e.g., wherein electrical feedback data indicates differences in one or more paths from one or more other paths) such as where a first portion of tissue is being sealed more quickly than another portion of tissue. In such a situation, the energy delivery through the three paths may be modified, e.g., turning off or reducing the energy to the portion of tissue that is being sealed more quickly, to correct the imbalance. As such, overcooking/undercooking of portions of tissue can be inhibited, thus leading to more effective tissue sealing and greater seal strength. Sensing may also allow for detection of edge-cutting on the periphery of the tissue-treatment area, and/or events that may be localized to a portion of the tissue-treatment area but perhaps not the entirety thereof. Error tones and/or other suitable warnings, in addition to or as an alternative to automatic energy customization, may be provided to warn the user as to the condition(s) detected.

The present disclosure is also applicable to RF instruments and systems (without ultrasonic energy) as well as other combination devices including RF and one or more other energy modalities (microwave, thermal, light, etc.). For example, the three-phase (or other poly-phase) configurations detailed above may be utilized with any suitable RF instrument including at least three different electrodes such as, for example and without limitation, described in U.S. Pat. No. 8,192,433, filed as U.S. patent application Ser. No. 11/894,354 on Aug. 21, 2007 11, 2021, the entire contents of which are hereby incorporated herein by reference.

While several aspects of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular aspects. Those skilled in the art will envision other modifications within the scope and spirit of the claims appended hereto.

What is claimed is:

1. A surgical system, comprising:
   an ultrasonic generator configured to provide an ultrasonic drive signal;
   an ultrasonic transducer coupled to the ultrasonic generator to receive the ultrasonic drive signal therefrom and configured, in response to receiving the ultrasonic drive signal, to produce mechanical ultrasonic energy;
   an electrosurgical generator configured to output three-phase Radio Frequency (RF) energy having a first phase, a second phase, and a third phase; and
   an end effector assembly, including:
      an ultrasonic blade coupled to the ultrasonic transducer and configured to receive the mechanical ultrasonic energy therefrom, the ultrasonic blade configured to supply the mechanical ultrasonic energy to tissue in contact with the ultrasonic blade to treat tissue, wherein at least a portion of the ultrasonic blade defines a first electrode;
      a second electrode; and
      a third electrode,
   wherein the first and second electrodes, the first and third electrodes, and the second and third electrodes are electrically coupled to the electrosurgical generator and configured to conduct the first, second, and third phases, respectively, of the three-phase RF energy therebetween and through tissue, and
   wherein the electrosurgical generator is configured to output a tissue treating energy via at least one of the first, second, or third phases and to output a tissue interrogation energy via at least one other of the first, second, or third phases.

2. The surgical system according to claim 1, wherein the end effector assembly further includes a jaw member movable relative to the ultrasonic blade to clamp tissue therebetween, and wherein the jaw member includes at least one of the second or third electrodes.

3. The surgical system according to claim 1, further comprising at least one panel extending along at least a portion of a length of the ultrasonic blade in spaced-apart relation relative thereto, wherein the at least one panel includes one of the second or third electrodes.

4. The surgical system according to claim 1, wherein the electrosurgical generator and the first, second, and third electrodes define a star-delta three-phase transformer configuration.

5. The surgical system according to claim 1, wherein the electrosurgical generator defines a multi-phase bridge driver configuration.

6. The surgical system according to claim 1, further comprising:
   a handle assembly; and
   an elongated assembly extending distally from the handle assembly, wherein the end effector assembly is supported at a distal end of the elongated assembly.

7. The surgical system according to claim 6, wherein at least one of the electrosurgical generator or the ultrasonic generator is supported on or within the handle assembly.

8. The surgical system according to claim 7, wherein both the electrosurgical generator and the ultrasonic generator are supported on or within the handle assembly, and wherein a battery assembly is also supported on or within the handle assembly.

9. The surgical system according to claim 1, wherein the electrosurgical generator is configured to enable at least two of the first, second, or third phases to have different energy parameters.

10. The surgical system according to claim 9, wherein the different energy parameters are different power levels.

11. The surgical system according to claim 1, further comprising:
    a robotic arm of a robotic surgical system; and
    an elongated assembly extending distally from the robotic arm, wherein the end effector assembly is supported at a distal end of the elongated assembly.

12. The surgical system according to claim 1, wherein the electrosurgical generator is configured to commutate the three-phase RF energy output.

13. The surgical system according to claim 12, wherein the electrosurgical generator is configured to commutate the three-phase RF energy output according to a pre-determined pattern.

14. The surgical system according to claim 1, wherein the ultrasonic generator and the electrosurgical generator are configured to simultaneously output the ultrasonic drive signal and the tissue treating energy, respectively, such that the mechanical ultrasonic motion and the tissue treating energy are simultaneously supplied to tissue for sealing tissue.

15. The surgical system according to claim 1, wherein the electrosurgical generator is further configured to simultaneously output the tissue treating energy and the tissue interrogation energy.

16. The surgical system according to claim 1, wherein the ultrasonic generator and the electrosurgical generator are combined into a single generator.

17. The surgical system according to claim 1, wherein the first, second, and third phases are 120 degrees out of phase relative to one another.

18. The surgical system according to claim 1, wherein the electrosurgical generator is further configured to switch the phases utilized for the tissue treating energy and the tissue interrogation energy such that the tissue treating energy is output via the at least one other of the first, second, or third phases and the tissue interrogation energy is output via the at least one of the first, second, or third phases.

19. The surgical system according to claim 1, wherein the electrosurgical generator is configured to output the tissue treating energy via two of the at least one first, second, or third phases.

20. The surgical system according to claim 1, wherein the electrosurgical generator is configured to output the tissue interrogation energy via two of the at least one other first, second, or third phases.

* * * * *